United States Patent [19]
Hilderbrandt

[11] Patent Number: 5,412,875
[45] Date of Patent: May 9, 1995

[54] EXPANDABLE LEVEL

[76] Inventor: Kenneth D. Hilderbrandt, P.O. Box 165, Brookhaven, N.Y. 11719

[21] Appl. No.: 144,408
[22] Filed: Nov. 2, 1993
[51] Int. Cl.6 .................................................. G01C 9/00
[52] U.S. Cl. .................................... 33/374; 33/451; 33/464
[58] Field of Search .................. 33/374, 451, 464, 384

[56] References Cited

U.S. PATENT DOCUMENTS

| | | | |
|---|---|---|---|
| 684,846 | 10/1901 | Moss | 33/374 |
| 2,551,524 | 5/1951 | Bullivant . | |
| 2,654,538 | 10/1953 | Fuller | 33/374 |
| 3,104,477 | 9/1963 | Edwill | 33/374 |
| 3,243,888 | 4/1966 | Redding . | |
| 3,648,378 | 3/1972 | Thingstad et al. . | |
| 4,607,437 | 8/1986 | McSorley, Sr. et al. | 33/374 |
| 5,269,066 | 12/1993 | Walters | 33/451 |

*Primary Examiner*—Christopher W. Fulton
*Attorney, Agent, or Firm*—Richard L. Miller

[57] ABSTRACT

An expandable level is provided, which consists of a main frame, at least one leveling vial mounted within the main frame, an extension frame and a mechanism for adjusting the position of the extension frame with respect to the main frame, so that an effective length of the level can be increased and decreased.

2 Claims, 1 Drawing Sheet

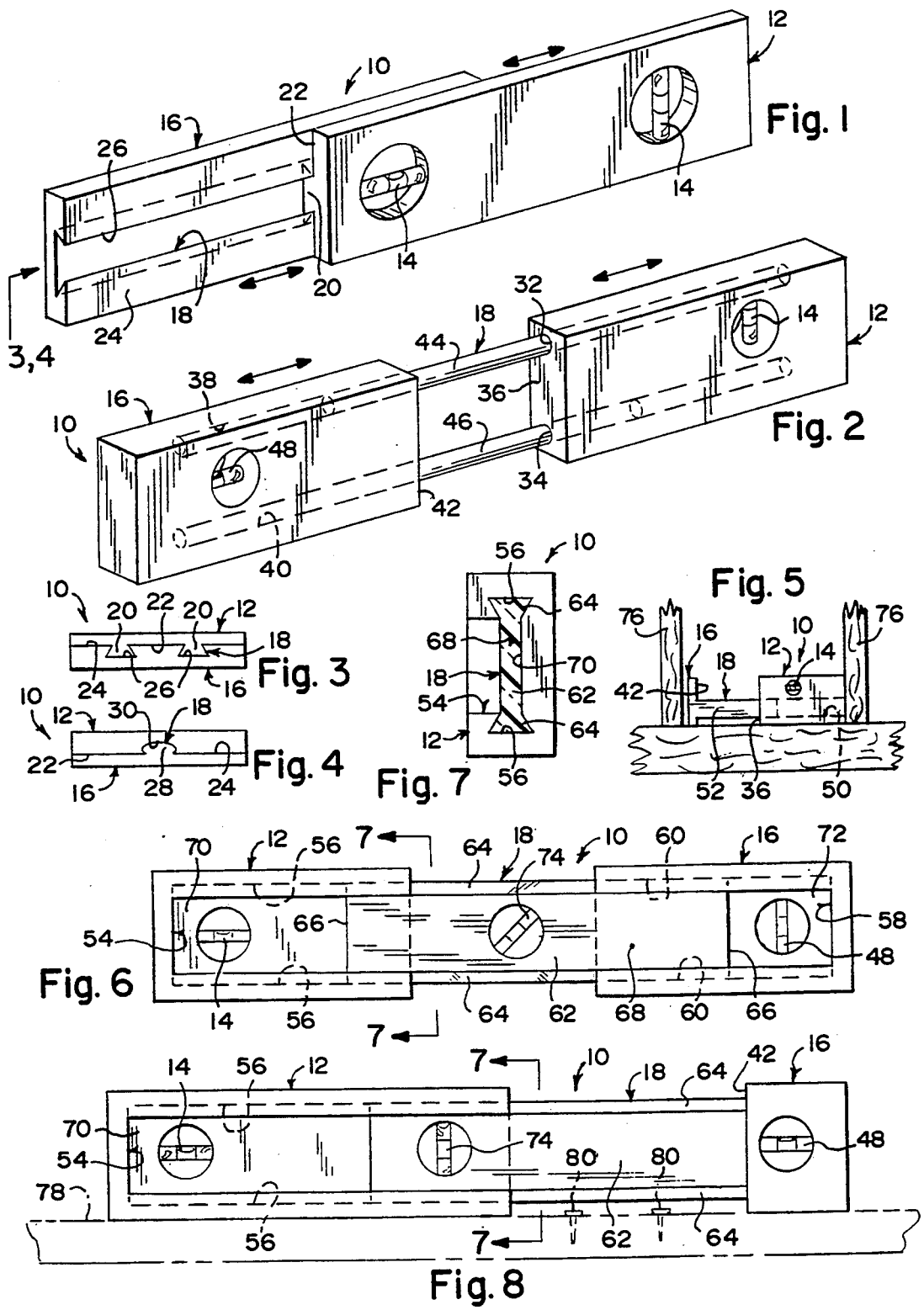

EXPANDABLE LEVEL

BACKGROUND OF THE INVENTION

The instant invention relates generally to levels and more specifically it relates to an expandable level.

Numerous levels have been provided in prior art that are adapted to be used by carpenters, masons, pipe fitters and other mechanics for determining vertical and horizontal positions and degrees of slope. For example, U.S. Pat. Nos. 2,551,524 to Bullivant; 3,243,888 to Redding and 3,648,378 to Thingstad et al. all are illustrative of such prior art.

While these units may be suitable for the particular purpose to which they address, they would not be as suitable for the purposes of the present invention as heretofore described.

SUMMARY OF THE INVENTION

A primary object of the present invention is to provide an expandable level that will overcome the shortcomings of the prior art devices.

Another object is to provide an expandable level that is adjustable to fit in narrow spaces, such as between studs in a wall, so as to establish a flat surface.

An additional object is to provide an expandable level that is constructed, so that it can sit upon a horizontal surface and clear nail heads protruding therefrom.

A further object is to provide an expandable level that is simple and easy to use.

A still further object is to provide an expandable level that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a perspective view of a first embodiment of the instant invention;

FIG. 2 is a perspective view of a second embodiment of the instant invention;

FIGS. 3 and 4 are end views taken in the direction of arrow 3, 4 in FIG. 1 illustrating other typical dove tail type constructions;

FIG. 5 is a front elevational view of the instant invention being used between studs;

FIG. 6 is a diagrammatic front elevational view of a third embodiment of the instant invention;

FIG. 7 is a cross sectional view taken on line 7—7 of FIGS. 6 and 8; and

FIG. 8 is a diagrammatic front elevational view of a fourth embodiment of the instant invention.

DETAILED DESCRIPTION OF THE PREFERRED EMBODIMENTS

Turning now descriptively to the drawings, in which similar reference characters denote similar elements throughout the several views, FIGS. 1 through 8 illustrate an expandable level 10 which consists of a main frame 12. At least one leveling vial 14 is mounted within the mainframe 12. An extension frame 16 is also provided, with a structure 18 for adjusting the extension frame 16 to the main frame 12, so that an effective length of level 10 can be increased and decreased.

The adjusting structure 18 in FIGS. 1 and 3, includes at least one undercut rib 20 extending longitudinally from a rear surface 22 of the main frame 12. A front surface 24 of the extension frame 16 has at least one inner undercut groove 26, extending longitudinally to fit into the corresponding undercut rib 20.

In FIG. 4, the adjusting structure 18 consists of at least one undercut rib 28 extending longitudinally from a front surface 24 of the extension frame 16. A rear surface 22 of the main frame 12 has at least one inner undercut groove 30, extending longitudinally to fit into the corresponding undercut rib 28.

The adjusting structure 18 in FIG. 2, includes the main frame 12 having a pair of longitudinally spaced apart bores 32, 34 extending inwardly from one end 36 thereof. The extension frame 16 has a pair of longitudinally spaced apart bores 38, 40 extending inwardly from one end 42 thereof. A pair of elongated rods 44, 46 are provided. A first segment of the first rod 44 is mounted in the first bore 32 in the main frame 12, so that a second segment of the first rod 44 can slide into the first bore 38 in the extension frame 16. A first segment of the second rod 46 is mounted in the second bore 40 in the extension frame 16, so that a second segment of the second rod 46 can slide into the second bore 34 in the main frame 12. At least one leveling vial 48 is mounted within the extension frame 16.

The adjusting structure 18 in FIG. 5, consists of the main frame 12 having a slot 50 extending longitudinally inwardly from one end 36. An elongated arm 52 extends longitudinally outwardly from one end 42 of the extension frame 16, so that the elongated arm 52 can slide into the slot 50.

The adjusting structure 18 in FIGS. 6 and 7 includes the main frame 12 having a front facing open track 54 with opposite inner undercut grooves 56. The extension frame 16 has a front facing open track 58 with opposite inner undercut grooves 60. An elongated arm 62 has a pair of undercut ribs 64, extending along opposite sides. Each end 66 of the elongated arm 62 can fit into the tracks 54, 58 in the main frame 12 and the extension frame 16, with the undercut ribs 64 sliding in the undercut grooves 56, 60.

The elongated arm 62 is fabricated out of a transparent material 68. A first leveling vial 14 is mounted within a back wall 70 of the track 54 in the main frame 12. a second leveling vial 48 is mounted within a back wall 72 of the track 58 in the extension frame 16. A third leveling vial 74 is mounted within the elongated arm 62, so that the first, second and third leveling vials 14, 48 and 74 can always be seen.

The adjusting structure 18 in FIG. 8, consists of the main frame 12 having a front facing open track 54 with opposite inner undercut grooves 56. An elongated arm 62 has a pair of undercut ribs 64 extending along opposite sides. The elongated arm 62 extends longitudinally outwardly from one end 42 of the extension frame 16. The elongated arm 62 can fit into the track 54 in the main frame 12 with the undercut ribs 64 sliding in the undercut grooves 56.

The elongated arms 62 in FIG. 8, is also fabricated out of a transparent material 62. A first leveling vial 14 is mounted within a back wall 70 of the track 54 in the main frame 12. A second leveling vial 48 is mounted within the extension frame 16. A third leveling vial 74 is mounted within the elongated arm 62, so that the first, second and third leveling vials 14, 48 and 74 can always be seen.

OPERATION OF THE INVENTION

To use the expandable level 10 a person can simply pull and push the extension frame 16 to increase and decrease the effective length. As illustrated in FIG. 5, the expandable level 10 can fit in a narrow space, such as between studs 76 in a wall. As illustrated in FIG. 8, the expandable level 10 can sit upon a horizontal surface 78 and clear nail heads 80 protruding therefrom.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An expandable level comprising a main frame; an extension frame; means for adjusting a position of said extension frame with respect to said main frame, so that an effective length of said level can be increased and decreased, including front facing open tracks with opposite inner undercut grooves formed on said main frame and on said extension frame, an elongated arm having a pair of undercut ribs extending along opposite sides, so that each end of said elongated arm can fit into said tracks in said main frame and said extension frame with said undercut ribs sliding in said undercut grooves; first and second leveling vials mounted within a back wall of said track in said main frame and in said extension frame, respectively; and, a third leveling vial mounted within said elongated arm, the elongate arm being fabricated of transparent material so that said first, second and third leveling vials can be seen in all positions of adjustment.

2. An expandable level comprising a main frame; an extension frame; means for adjusting a position of said extension frame with respect to said main frame, so that an effective length of said level can be increased and decreased, including a front facing open track with opposite inner undercut grooves formed on said main frame and an elongated arm having a pair of undercut ribs extending along opposite sides, said elongated arm extending longitudinally outwardly from one end of said extension frame, so that said elongated arm can fit into said track in said main frame with said undercut ribs sliding in said undercut grooves; a first leveling vial mounted within a back wall of said track in said main frame; a second leveling vial mounted within said extension frame; and a third leveling vial mounted within said elongated arm, said elongated arm being fabricated of a transparent material so that said first, second and third leveling vials can be seen in all positions of adjustment.

* * * * *